US009608329B2

(12) United States Patent
Liu et al.

(10) Patent No.: US 9,608,329 B2
(45) Date of Patent: Mar. 28, 2017

(54) SPACE SAVING MULTIBAND ANTENNA (71) Applicant: Microsoft Technology Licensing, LLC, Redmond, WA (US)

(72) Inventors: Luyi Liu, Sammamish, WA (US); Devis Iellici, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 13 days.

(21) Appl. No.: 14/440,561

(22) PCT Filed: Nov. 8, 2013

(86) PCT No.: PCT/US2013/069342
§ 371 (c)(1),
(2) Date: May 4, 2015

(87) PCT Pub. No.: WO2014/074948
PCT Pub. Date: May 15, 2014

(65) Prior Publication Data
US 2015/0280323 A1    Oct. 1, 2015

(30) Foreign Application Priority Data

Nov. 8, 2012  (GB) .................................. 1220131.5

(51) Int. Cl.
*H01Q 1/24*      (2006.01)
*H01Q 9/04*      (2006.01)
(Continued)

(52) U.S. Cl.
CPC ........... *H01Q 9/0414* (2013.01); *H01Q 1/243* (2013.01); *H01Q 5/307* (2015.01); *H01Q 5/328* (2015.01);
(Continued)

(58) Field of Classification Search
CPC ........ H01Q 1/243; H01Q 5/307; H01Q 5/328; H01Q 5/335; H01Q 5/357; H01Q 9/0414; H01Q 9/0421
(Continued)

(56) References Cited

U.S. PATENT DOCUMENTS 6,049,314 A  *  4/2000  Munson ................... H01Q 1/38
                                                343/700 MS
7,319,432 B2 *  1/2008  Andersson ............. H01Q 1/243
                                                    343/702
(Continued)

FOREIGN PATENT DOCUMENTS

CN        2509741 Y      9/2002
CN      101442153 A      5/2009
(Continued)

OTHER PUBLICATIONS

United Kingdom Intellectual Property Office Search Report, Application No. GB1220131.5, dated Mar. 5, 2013. 4 pages.
(Continued)

*Primary Examiner* — Tho G Phan
(74) *Attorney, Agent, or Firm* — Holzer Patel Drennan (57) ABSTRACT

There is disclosed a multiband antenna device comprising a conductive elongated antenna element configured for electrical connection to a conductive groundplane at a grounding point, and for electrical connection to a radio transmitter/receiver at a feeding point. The antenna element comprises a first portion and a second portion. The first portion is configured to extend in a first direction along a first outside edge of the groundplane, and then in a second direction along a second outside edge of the groundplane. The second portion of the antenna element is configured to double back next to the first portion in a third, substantially counter-parallel direction back along the second outside edge of the groundplane, and then in a fourth direction along the first (Continued)

outside edge of the groundplane. The second portion of the antenna element terminates with a high impedance portion, and the high impedance portion of the antenna element is positioned between the first edge of the ground plane and the first portion of the antenna element so as to form a narrow gap that electromagnetically couples the first and second portions of the antenna element.

10 Claims, 11 Drawing Sheets (51) Int. Cl.
    *H01Q 5/307* (2015.01)
    *H01Q 5/328* (2015.01)
    *H01Q 5/335* (2015.01)
    *H01Q 5/357* (2015.01)

(52) U.S. Cl.
    CPC ............ *H01Q 5/335* (2015.01); *H01Q 5/357* (2015.01); *H01Q 9/0421* (2013.01)

(58) Field of Classification Search
    USPC .......................... 343/700 MS, 702, 829, 846
    See application file for complete search history.

(56) References Cited

U.S. PATENT DOCUMENTS

| | | | | |
|---|---|---|---|---|
| 7,482,984 B2* | 1/2009 | Rosengren | ............ | H01Q 1/243 343/700 MS |
| 7,893,877 B2* | 2/2011 | Wang | .................. | H01Q 1/2258 343/700 MS |
| 8,072,389 B2* | 12/2011 | Chang | ..................... | H01Q 1/38 343/700 MS |
| 2004/0075613 A1 | 4/2004 | Jarmuszewski | | |
| 2004/0108957 A1 | 6/2004 | Umehara | | |
| 2004/0113847 A1 | 6/2004 | Qi | | |
| 2005/0017906 A1 | 1/2005 | Man | | |
| 2005/0184914 A1 | 8/2005 | Ollikainen | | |
| 2010/0052997 A1 | 3/2010 | Kan et al. | | |
| 2011/0001675 A1 | 1/2011 | Lee | | |
| 2011/0043408 A1 | 2/2011 | Shi et al. | | |
| 2011/0199267 A1 | 8/2011 | Hayashi | | |
| 2011/0298669 A1 | 12/2011 | Rao | | |

FOREIGN PATENT DOCUMENTS

| | | |
|---|---|---|
| CN | 101567483 A | 10/2009 |
| EP | 2381527 A1 | 10/2011 |
| GB | 2509302 A | 2/2014 |
| JP | 2011066713 A | 3/2011 |
| JP | 2012049783 A | 3/2011 |
| WO | 2010028521 A1 | 3/2010 |
| WO | 2010120218 A | 10/2010 |
| WO | 2010120218 A1 | 10/2010 |

OTHER PUBLICATIONS

International Searching Authority, U.S. Patent and Trademark Office, International Search Report for PCT/US2013/069342, dated Mar. 5, 2014, 4 pages.
International Searching Authority, U.S. Patent and Trademark Office, Written Opinion for PCT/US2013/069342, mailed May 3, 2014, 6 pages.
"Office Action Issued in UK Patent Application No. 1220131.5", Mailed Date: Feb. 16, 2016, 5 Pages.
"Office Action Issued in United Kingdom Patent Application No. 1220131.5", Mailed Date: Jun. 16, 2016, 3 Pages.
"Office Action Issued in United Kingdom Patent Application No. 1220131.5", Mailed Date: Jul. 20, 2016, 2 Pages.
"First Office Action and Search Report Issued in Chinese Patent Application No. 201380069834.1", Mailed Date: Dec. 2, 2016, 14 Pages.

* cited by examiner

Basic embodiment of the antenna

SPACE SAVING MULTIBAND ANTENNA

The present application is a U.S. 371 National Phase Patent Application and claims benefit of Patent Corporation Treaty Application PCT/US2013/069342, entitled "Space Saving Multiband Antenna" filed 8 Nov. 2013, which takes priority from U.K. Patent Application 1220131.5 entitled "Space Saving Multiband Antenna" filed 8 Nov. 2012, both of which are incorporated herein by reference in their entirety.

TECHNICAL FIELD

Embodiments of the present invention relate to a space saving multiband antenna capable of operating in multiple frequency ranges. In particular, but not exclusively, embodiments of the present invention provide a space saving antenna that may be positioned in one corner of a radio communication device while still providing multiband operation.

BACKGROUND

The recent evolution of handheld communication devices, from simple mobile phones to more complex multifunctional smartphones, has seen a significant increase in size of certain components in the devices. In particular, the size of the liquid crystal display (LCD) has grown so that the user is able to visualize more information, larger pictures and videos, and also so that the display may be operated more easily as a touchscreen. The battery has also grown in size in order to provide sufficient power to drive the larger LCD, faster microprocessors, and other components.

Simultaneously, the size of other components in the devices has had to be reduced in order to accommodate the more consumer focused components such as the larger LCD and battery. In particular, there has been constant progress in miniaturizing the antennas used by the terminal to communicate with radio base stations (cellular), satellites (GPS), hot-spots (WiFi) and other terminals (Bluetooth®).

The miniaturization of cellular antennas poses significant technical challenges, especially since operating demands on the antenna are often increased. Novel, miniaturized antennas are expected to maintain or even increase the operating frequency ranges in order to be able to cover ever more communication protocols, in different frequency bands. The introduction of the Long Term Evolution (LTE) standard places further demands on the requirements of cellular antennas. In some countries, LTE requires the use of the 698 MHz to 798 MHz frequency band. The corresponding wavelength for this frequency range is large and would typically necessitate larger antennas, in stark contrast with the requirement for miniaturizing the antennas. Moreover, the LTE standard requires a multiple-in multiple-out (MIMO) antenna system, which requires the use of multiple antennas working in the same frequency band with a similar level of performance. Therefore, the LTE standard requires fitting at least two cellular antennas in an LTE-capable handheld terminal, leaving even less space for each single antenna.

Figure 1:
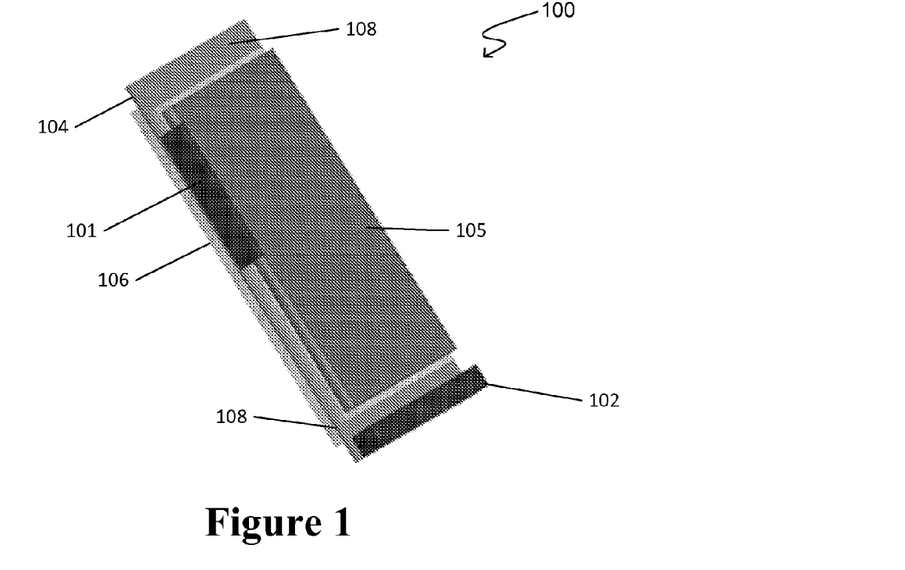
FIG. 1 shows a schematic representation of a typical modern cellular handheld device.

FIG. 1 shows a schematic representation of a typical modern cellular handheld device 100. The terminal shows two cellular antenna elements 102, 101. The first antenna element 102 is placed at the bottom end of the printed circuit board (PCB) 104 containing the electronic components. This arrangement maximizes the space available for the LCD display 106 and the battery 105. The second antenna element 101 is often placed along one of the long edges of the device 100. However, because limited space is available (due to the large display 106 and battery 105) the second antenna 101 normally has inferior performance compared to the first antenna 102, and is typically used only for diversity reception, not being suitable for full MIMO applications. The performance of the second antenna 101 is also hindered by its position as the second antenna 101 is likely to be covered by the user's hand during normal use of the device 100. The antenna free area 108 at the top of the device 100 is usually kept free from antenna elements because positioning a second antenna in this area may generate high electromagnetic fields in the user's head, and therefore cause the device 100 to fail the regulatory compliance tests (e.g. Specific Absorption Rate (SAR) and Hearing Aid Compatibility (HAC) tests).

Figure 2:
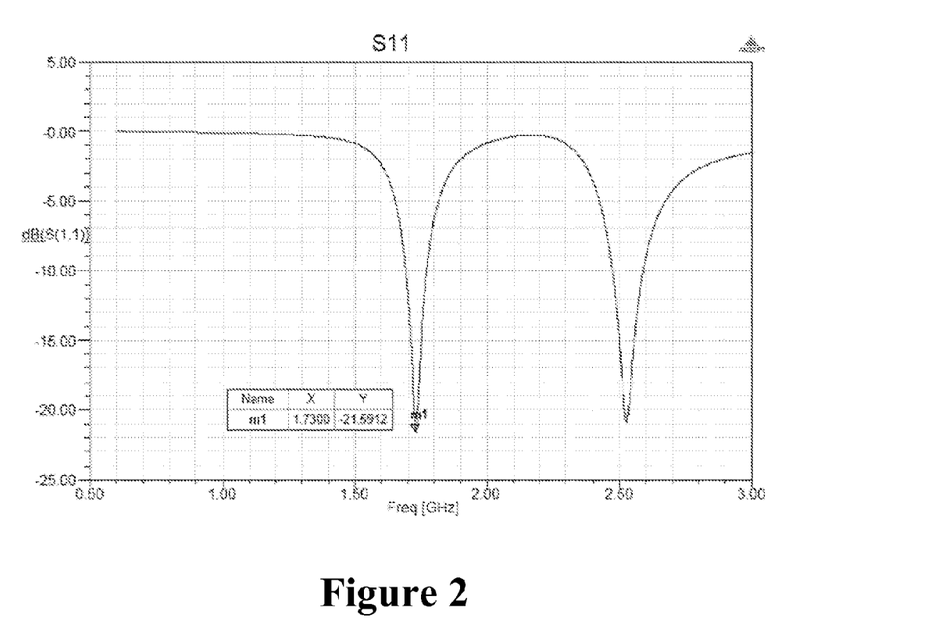
FIG. 2 shows an impedance matching plot for an antenna of the type disclosed in US 2011/0199267.

A convenient antenna arrangement is known from US 2011/0199267, where two L-shaped antenna are positioned in adjacent corners of a handheld telecommunications device. This arrangement reduces the influence the user has on the antenna characteristics by minimizing the electromagnetic currents on the PCB of the device, where the PCB typically functions as the groundplane for the antennas. However, this arrangement suffers from a severe limitation if one wants to use a similar concept at low frequency (<1 GHz). In fact, it is well known from D. Manteuffel, A. Bahr, D. Heberling, and I. Wolff, "Design considerations for integrated mobile phone antennas," in Proc. 11th Int. Conf. Antennas Propagat., 2001, pp. 252-256, that in order to achieve sufficient bandwidth at low frequency using a compact antenna in a handheld device, the antenna must be capable of exciting electromagnetic currents on the large conductive parts of terminal (PCB, LCD, or chassis), so the antennas can function as efficient, low-Q radiators. In US 2011/0199267, the antenna does not appear to excite sufficiently large electromagnetic currents on the conductive parts of the terminal to be able to operate as an efficient, wide frequency band antenna at low frequencies. An electromagnetic simulation performed using the antenna parameters disclosed in US 2011/0199267 shows that its lowest resonant frequency is around 1730 MHz, as shown in FIG. 2. Scaling the antenna of US 2011/0199267 so that it is able to operate below 1 GHz would result in an impractically large antenna with narrowband behaviour.

SUMMARY

Viewed from a first aspect, there is provided a multiband antenna device comprising a conductive elongate antenna element configured for electrical connection to a conductive groundplane at a grounding point, and for electrical connection to a radio transmitter/receiver at a feeding point, wherein the antenna element comprises a first portion and a second portion, the first portion is configured to extend in a first direction along a first outside edge of the groundplane, and then in a second direction along a second outside edge of the groundplane, and the second portion of the antenna element is configured to double back next to the first portion in a third, substantially counter-parallel direction back along the second outside edge of the groundplane, and then in a fourth direction along the first outside edge of the groundplane, the second portion of the antenna element terminating with a high impedance portion, the high impedance portion of the antenna element being positioned between the first edge of the ground plane and the first portion of the antenna element, and forming a narrow gap that electromagnetically couples the first and second portions of the antenna element.

The antenna element may extend in two planes, each substantially orthogonal to the groundplane. The planes may also be substantially orthogonal to each other (for example, where the first and second outside edges of the groundplane are substantially at right angles to each other and meet at a corner). The grounding point and the feeding point are typically adjacent to each other; in such an arrangement the grounding point provides a shunt inductance near the feeding point which compensates the capacitive behaviour of the antenna and creates an approximate resonance in the antenna impedance. An impedance matching circuit may also be interposed between the feeding point of the antenna element and the radio transmitter/receiver.

The purpose of this particular arrangement of the antenna device is to have the high impedance portion of the antenna element in a position away from the corner and closer to the middle of the first edge of the groundplane, in such a way that the high impedance portion is positioned away from a user's hand in a typical usage condition. This feature reduces the effect of the user's hand on the operation of the antenna. The high impedance portion of the antenna element is characterized by a high electric field that is affected by the relatively high electric permittivity of the hand tissues. Conversely, magnetic fields dominate in lower impedance portions of the antenna element but the magnetic field distribution is less affected by the presence of the user's hand as the magnetic permeability of the tissues is close to that of air.

The antenna element may be positioned within the profile of the groundplane, for example above the inside edge of the groundplane. However if this arrangement is used, a portion of the conductive part of the groundplane must be removed directly underneath the antenna element. Removing a portion of the conductive part of the groundplane prevents a severe reduction in the antenna bandwidth.

The feeding point and grounding point may be arranged with the feeding point closer to the corner of the groundplane, or the grounding point closer to the corner of the groundplane.

In some embodiments, the antenna element may be provided with additional portions extending in other planes. This arrangement can provide an extended effective electrical length of the antenna element, this enabling a lower minimum resonant frequency of the antenna element. The extending portions may be positioned in line with the first or second edge of the groundplane. The extending portions may be substantially parallel to the groundplane, for example in a plane above the groundplane, or may be substantially perpendicular to the groundplane, or both.

In some embodiments, the antenna device is configured to fit within a handset (such as a smartphone handset) by placing the antenna element across the groundplane edge so that part of the antenna element overhangs other components of the handset such as the battery and the LCD.

In some embodiments, the antenna element may be connected to the groundplane through an impedance element such as an inductor or a capacitor providing the advantage of allowing the frequency of the lowest resonance of the antenna to be tuned or changed. Alternatively, the impedance element may be replaced with an electronically controlled variable impedance such as a varicap diode, or a radio frequency (RF) switch that commutes between two or more impedance elements of a different type or value (inductors or capacitors).

Embodiments of the antenna device are well-suited for MIMO applications, since two similar (but mirror image) antenna elements can be arranged at adjacent corners of the groundplane, for example at a lower edge of the handset PCB.

BRIEF DESCRIPTION OF THE DRAWINGS

Embodiments of the invention are further described hereinafter with reference to the accompanying drawings, in which.

DETAILED DESCRIPTION

There is a need for a very compact cellular antenna structure that is easily accommodated within a handheld terminal such as a smartphone, without diminishing the space available for other components such as the display and battery.

Figure 3:
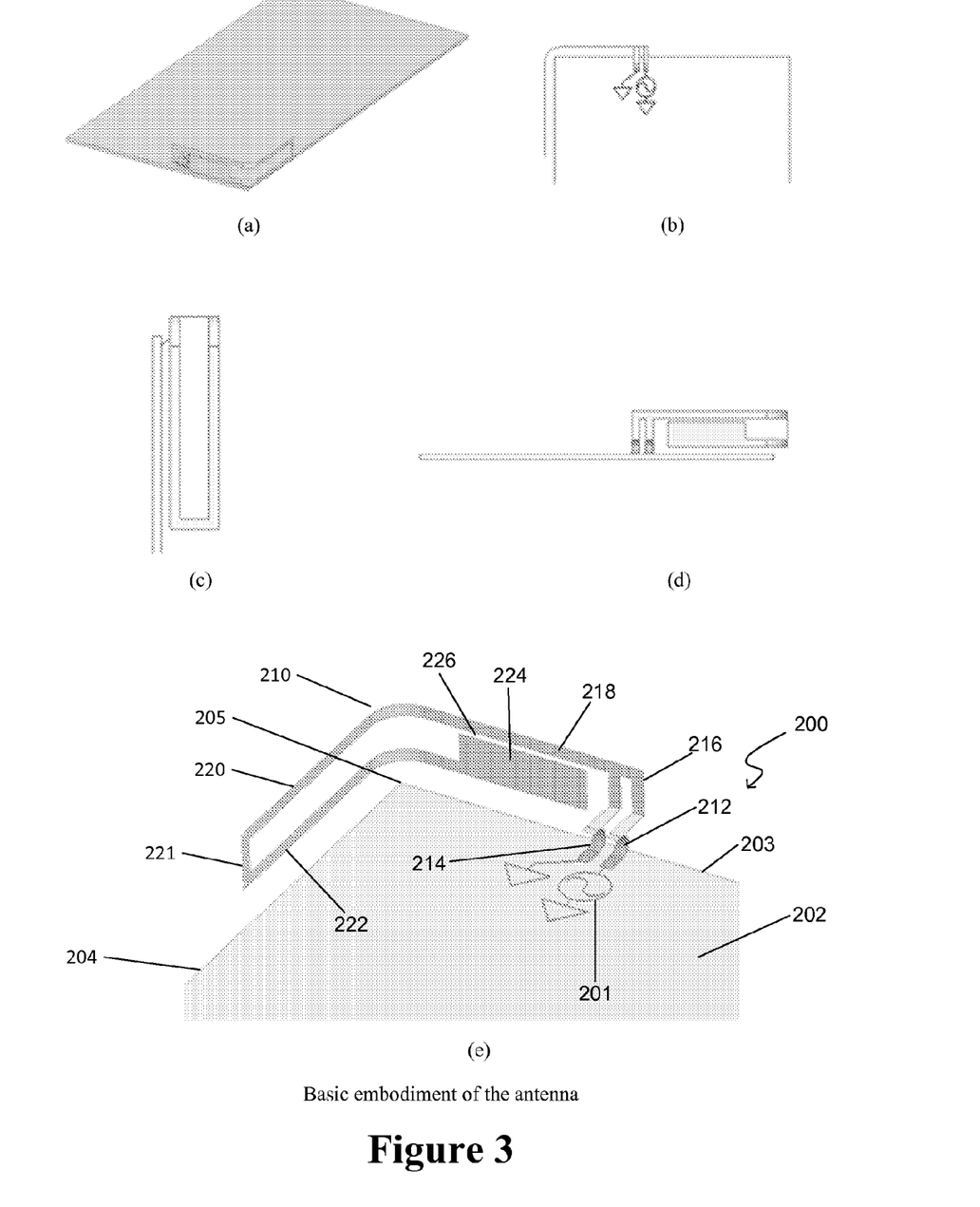
FIGS. 3a, 3b, 3c, 3d, and 3e show an antenna device with an elongated conductive antenna element.

FIG. 3 shows a basic embodiment of an antenna device 200 of the present application. An antenna element 210 is described with reference to various portions. The antenna element is connected to the groundplane 202 via a feeding point 212 and a grounding point 214. The grounding point 214 and the feeding 212 point are typically adjacent to each other; in such an arrangement the grounding point 214 provides a shunt inductance near the feeding point 212 which compensates the capacitive behaviour of the antenna element 210 and creates an approximate resonance in the antenna impedance. An impedance matching circuit (not shown) may also be interposed between the feeding point 212 of the antenna element 210 and the radio transmitter/receiver 201. The groundplane 202 may be a printed circuit board (PCB) or the LCD conducting frame or the metal chassis of the smartphone or other large conductive structure. A first portion 218, 220 of the antenna element 210 extends along a first outside edge 203 of the groundplane 202, and bends around a corner 205 defined by the first 203 and a second 204 outside edge of the groundplane 202, and further extends along the second outside edge 204 of the groundplane 202. The second portion 222, 224 of the antenna element double backs on the first portion by way of a U-bend 221 so that the second portion 222, 224 of the antenna element 210 is closer to the groundplane 202. The second portion extends in a third substantially counter parallel direction along the second outside edge 204 of the groundplane and extends around the corner 205 of the groundplane edge, and then along the first outside edge 203 of the groundplane 202. The antenna element 210 terminates with a high impedance portion 224 configured to create a narrow gap 226 between the first 218, 220 and second portions 222, 224 of the antenna element 210. The narrow gap 226 electromagnetically couples the first and second portions of the antenna element 210.

FIG. 3 shows an embodiment of the present invention where the groundplane 202 is a rectangular planar structure. Other groundplane shapes are also envisaged.

The high impedance portion 224 terminates the antenna element 210 between the first portion of the antenna element 210 and the first edge 203 of the groundplane 202, and creates a high electric field. When the antenna device 200 is positioned in the upper or lower part of the handheld terminal or smartphone, the high impedance portion 224 is positioned at the top of the antenna device 200 away from the region where the user's hand is normally located in use. The high impedance portion 224 of the antenna is characterized by a high electric field more susceptible to the affects of the relatively high electric permittivity of the tissue of the hand compared with the lower impedance parts of the antenna, where the magnetic field dominates. The magnetic field distribution is less affected by the presence of the user's hand as the magnetic permeability of the tissue of the hand is close to that of air. Therefore, positioning the high impedance portion 224 of the antenna 200 away from the user's hand, recessed from the corner 205 of the groundplane 202 and closer to the middle of the first edge 203, greatly improves the antenna performance in use.

Although the groundplane 202 is shown with a sharp corner 205, it is also possible to use a groundplane 202 with a chamfered or rounded corner, or one with a filleted corner. Care needs to be taken in certain embodiments so that there is no groundplane 202 directly underneath the antenna element 210, even at the corner 205.

Figure 4:
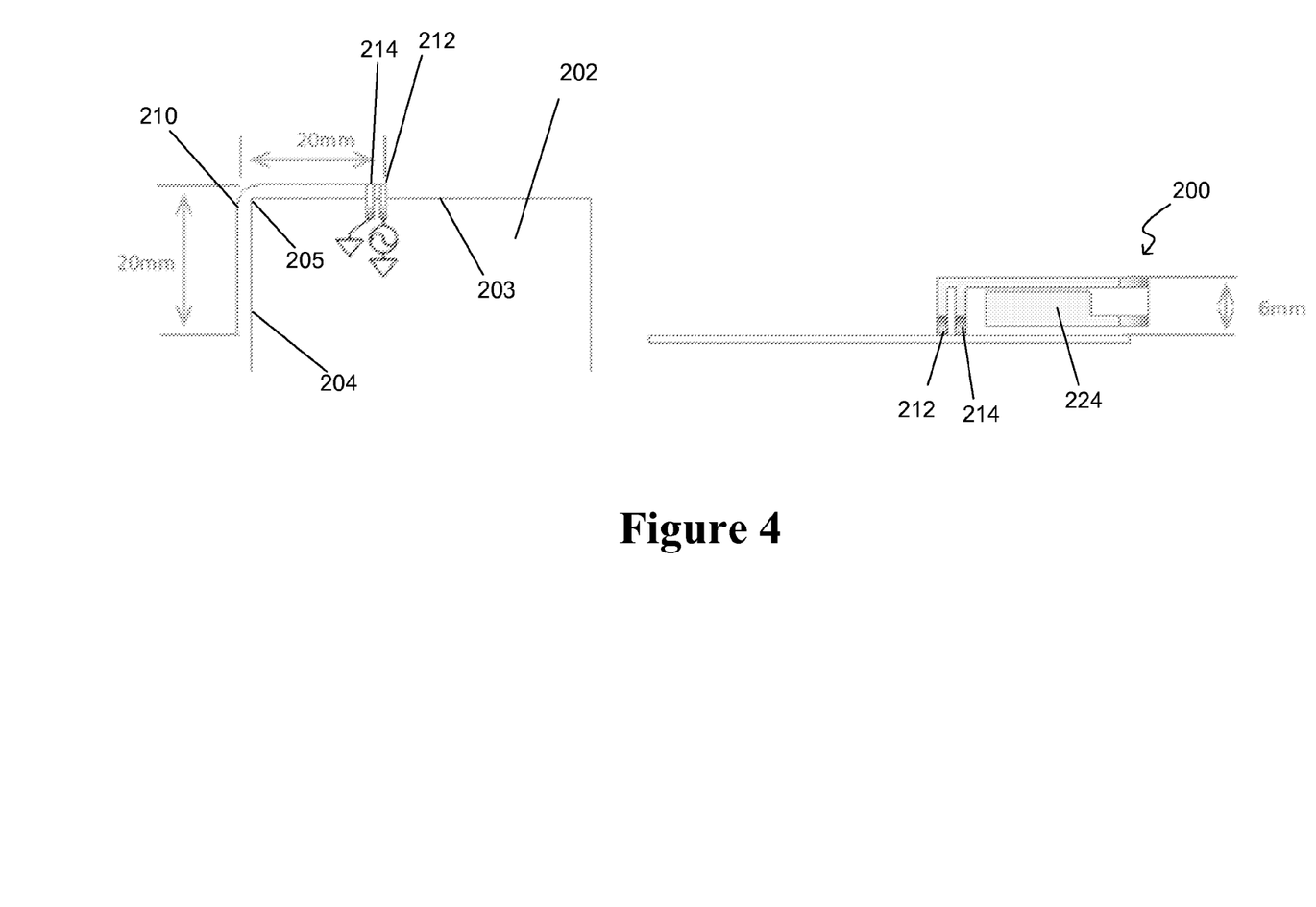
FIG. 4 shows an example of the dimensions for an antenna device of the present invention.

FIG. 4 shows a particular example of the present antenna device. The antenna element 210 extends approximately 20 mm along the first edge 203 of the groundplane 202, bends around the corner 205 defined by the first 203 and a second 204 edge of the groundplane 202, and then extends approximately 20 mm along the second edge 204 of the groundplane 202 before doubling back in a substantially counter-parallel direction. The antenna element 210 is elevated above the ground plane 202 by approximately 6 mm via the grounding point 214 and the feeding point 212 protruding from the groundplane 202. It should be noted that the dimensions of the antenna element 210 are just an example of one particular embodiment. The dimensions of the antenna are dictated by the required operating frequencies and bandwidth of the antenna.

Figure 5:
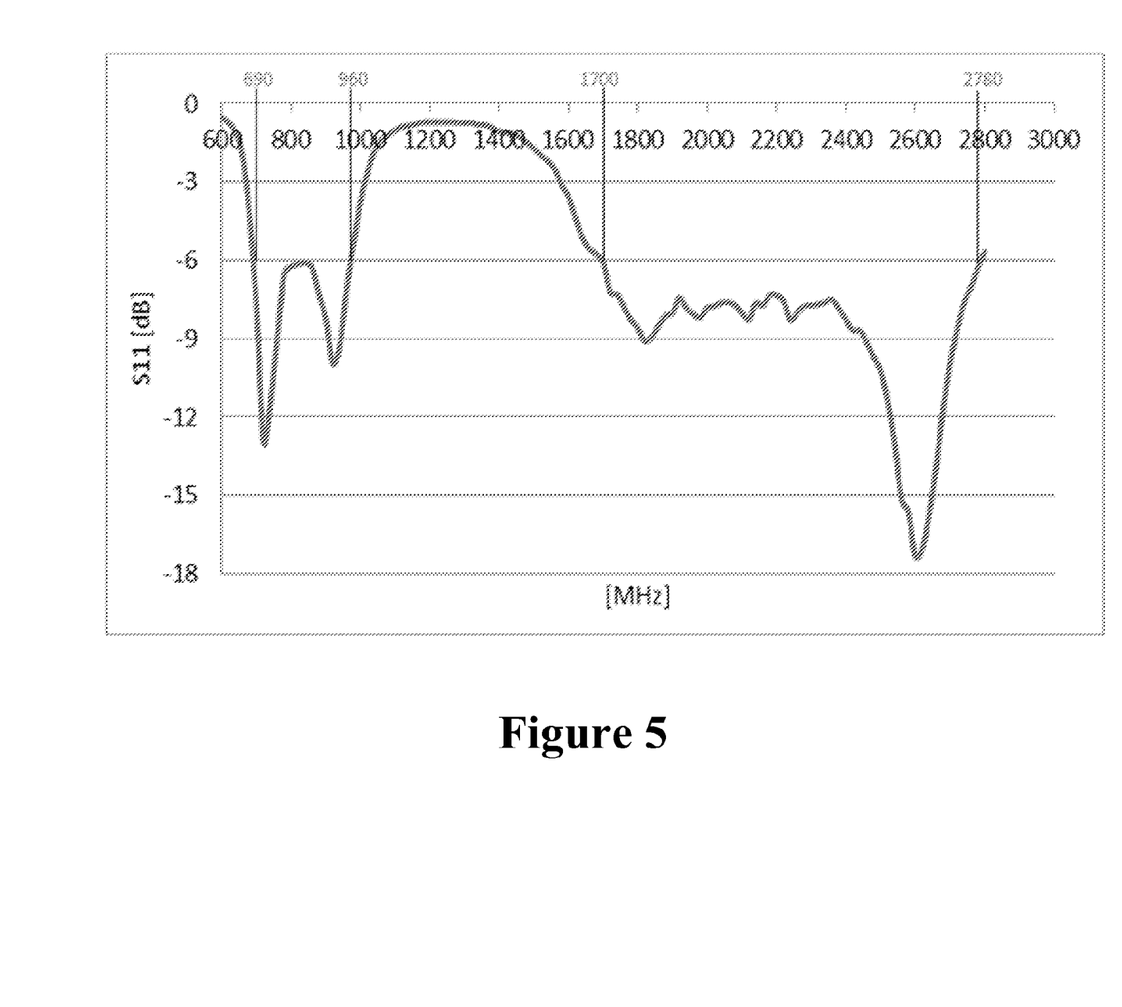
FIG. 5 shows an impedance matching plot for the antenna of FIG. 4.
Figure 6:
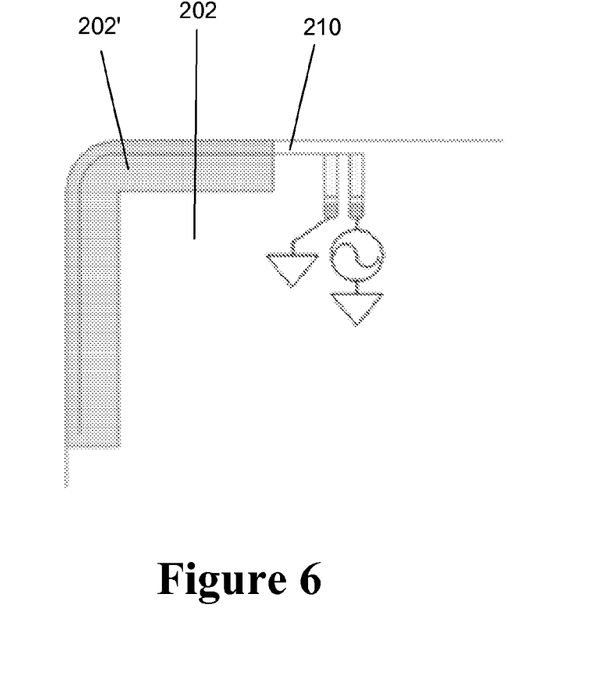
FIG. 6 shows an antenna device with a portion of the conductive groundplane removed.

In order to illustrate the very significant frequency bandwidth that can be obtained using the simple structure described above, the reflection parameter $10*\log_{10}(|S11|^2)$ for an antenna with dimensions as described in FIG. 4 is shown in FIG. 5. The antenna of FIG. 4 has an overall groundplane with a height of approximately 120 mm and a width of approximately 56 mm. FIG. 6 demonstrates the antenna functioning at all frequency bands between 690 MHz to 960 MHz and 1700 MHz to 2780 MHz with a reflection parameter better than −6 dB (or voltage standing wave radio (VSWR) lower than 3:1). In comparison, the antenna disclosed in US 2011/0199267 has a minimum operating frequency of about 1600 MHz when the antenna dimensions are the same.

As shown in FIGS. 3 and 4, the bulk of the antenna element 210 is positioned outside the profile of the ground plane 202. The antenna element extends along the outside edges 203, 204 of the groundplane 202. This is necessary because positioning the antenna element 210 directly above the groundplane 202 severely reduces antenna bandwidth due to the creation of mirror images of currents on the antenna elements 210 that are formed in the groundplane 202. Mirror currents have opposite directions and cancel out the currents on the antenna.

FIG. 6 shows how it is possible to place the antenna within the profile of the groundplane or ground structure 202 by removing a section of the conductor forming the groundplane 202 directly below the antenna element 210, leaving either a section of dielectric substrate 202' or free space. This arrangement can further reduce the overall size of the antenna device 200 since the antenna element 210 may reside inside the profile of the groundplane 202, elevated above the region where the conductive material is removed.

Figure 7:
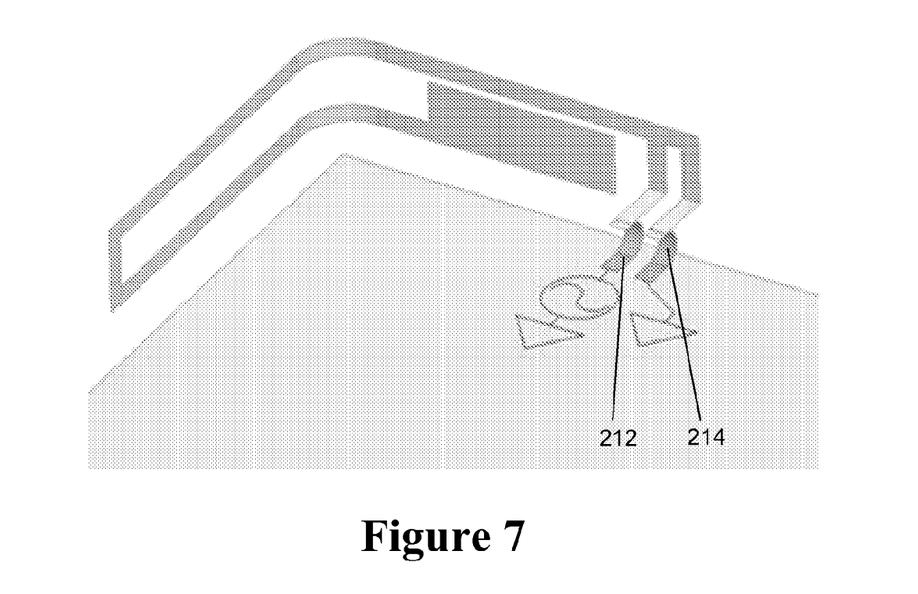
FIG. 7 shows an antenna device with the grounding point and feeding point interchanged.

FIG. 7 shows an embodiment where the feeding point 212 and grounding point 214 are interchanged. Interchanging the feeding point 212 and the grounding point 214 affects the resonant frequency and the impedance matching in ways that are appropriate for some implementations.

Figure 8:
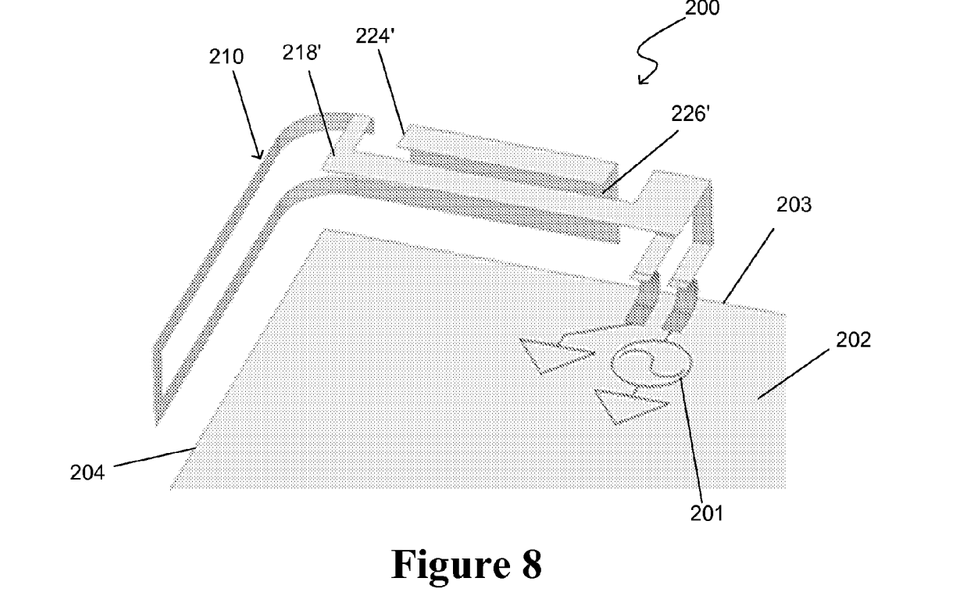
FIG. 8 shows an antenna device with an extending portion on the antenna element.

FIG. 8 shows an antenna device 200 where the antenna element 210 extends in a third plane 218', 224' approximately parallel to the plane defined by the groundplane 202. In this embodiment, the first portion of the antenna element 210 that runs parallel to the first edge 204 and is close to the feeding point is extended 218' in the plane substantially parallel to and elevated above the plane defined by the groundplane 202. The high impedance portion 224 that terminates the second portion of the antenna element is also extended 224' in a third plane resulting in the narrow gap 226' being in the third plane parallel to the groundplane 202. This arrangement allows an increased electrical length of the antenna element 210, and therefore lowers the minimum resonant frequency of the antenna device 200.

Figure 9:
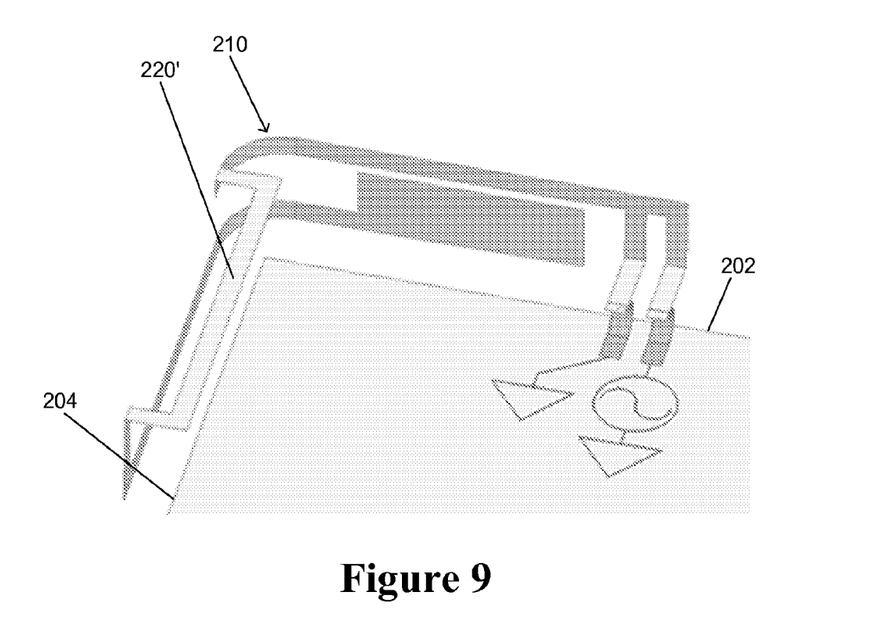
FIG. 9 shows an antenna device with a different extending portion on the antenna element.

FIG. 9 shows an antenna device where the antenna element 210 extends 220' in a third plane substantially parallel to the plane defined by the groundplane 202 in the section of the antenna element 210 where the antenna element runs along the second edge 204 of the groundplane 202.

Figure 10:
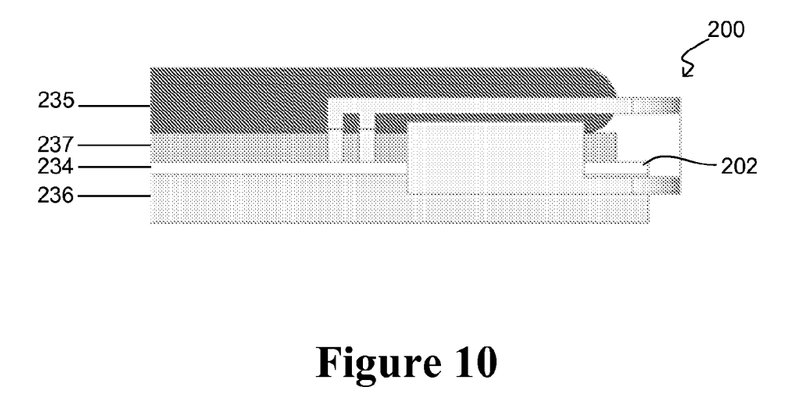
FIG. 10 shows the small thickness of the antenna device compared to other components in a smartphone.

FIG. 10 shows an arrangement of the components of a smartphone relative to the position of the antenna device 200. In general, when used in a smartphone handset, the antenna device 200 is placed on the battery side in order to keep it away from the user's head. It is possible to reduce the effective thickness of the antenna device by placing it across the groundplane 202, so that part of the antenna is on the LCD 236 side of the handset, and part is on the battery 235 side, as illustrated in FIG. 10. This results in an overall thinner design of the device. FIG. 10 shows that the total height of the antenna 200 is less than the stack formed by the LCD 236, the PCB 234, the shielding cans 237 containing the electronic circuits and the battery 235.

Figure 11:
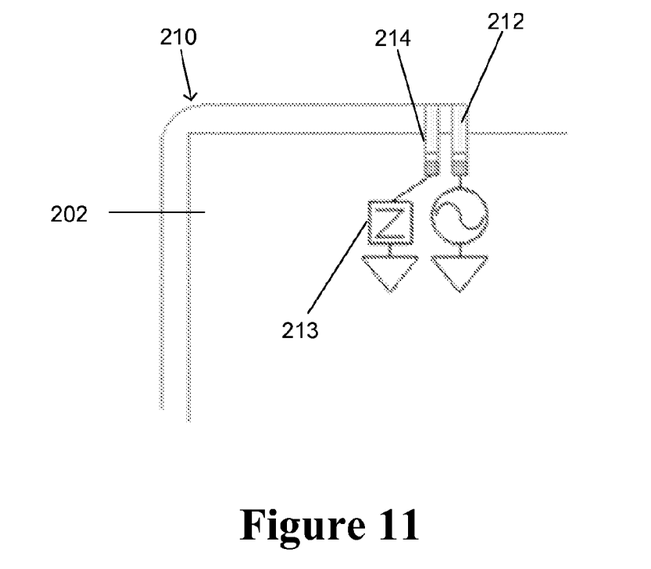
FIG. 11 shows the antenna element connected to the groundplane through an impedance element.

A further advantage of the antenna devices of the present application relates to adjustable lowest resonance frequency. The frequency of the lowest resonance can be adjusted by connecting the antenna element 210 to the groundplane 202 through an impedance element 213, for example, an inductor or a capacitor. FIG. 11 shows the antenna device with the grounding point 214 connected to the groundplane 202 through an impedance element 213. If the impedance element 213 is an inductor, then the frequency of the lowest resonance is lowered, and if the impedance element 213 is a capacitor then the frequency is increased.

Figure 12:
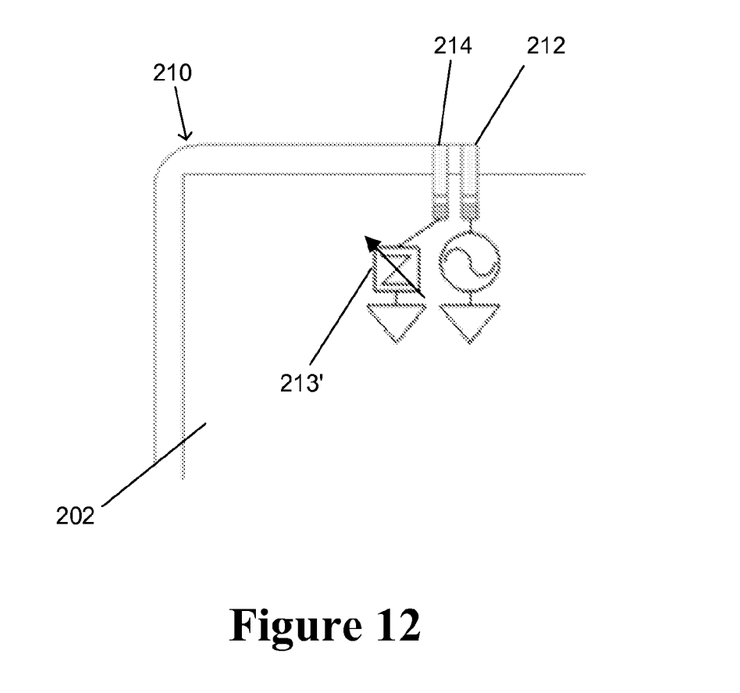
FIG. 12 shows the antenna element connected to the groundplane through a variable impedance element.

FIG. 12 shows the antenna device with the grounding point 214 connected to the groundplane 202 through a variable impedance element 213'. With such an arrangement the antenna can be made electronically tuneable by employing an electronically controlled variable impedance, such as a varicap diode. Alternatively, the variable impedance element 213' could be an electronically controlled radio frequency (RF) switch that commutes between two or more impedance elements of different type or values (inductors and capacitors), therefore providing a number of different states corresponding to different bandwidths. For instance, in one state the lower resonance of the antenna could cover the LTE700 frequency range (698-798 MHz) and in a second state the GSM 850/900 range (824-960 MHz)

The antenna devices described in FIGS. 3 to 12 are mechanically simple to construct, using standard manufacturing processes. This type of device may also be embedded within a structure. For instance, the antenna device can be formed by means of an etching process on a flexible printed circuit (FPC). The FPC is then attached to a plastic carrier (211 in FIG. 13) by means of an adhesive layer. The connection to the radio transceiver and the grounding can be done using a pair of elastic spring contacts or spring probes known in the art as "pogo pins".

In other embodiments, the antenna device may be formed from a single sheet of metal that is appropriately cut and then bent into shape. The antenna device is then attached to a separate plastic antenna carrier or directly to the plastic case of the terminal using heat stakes or other processes.

Figure 13:
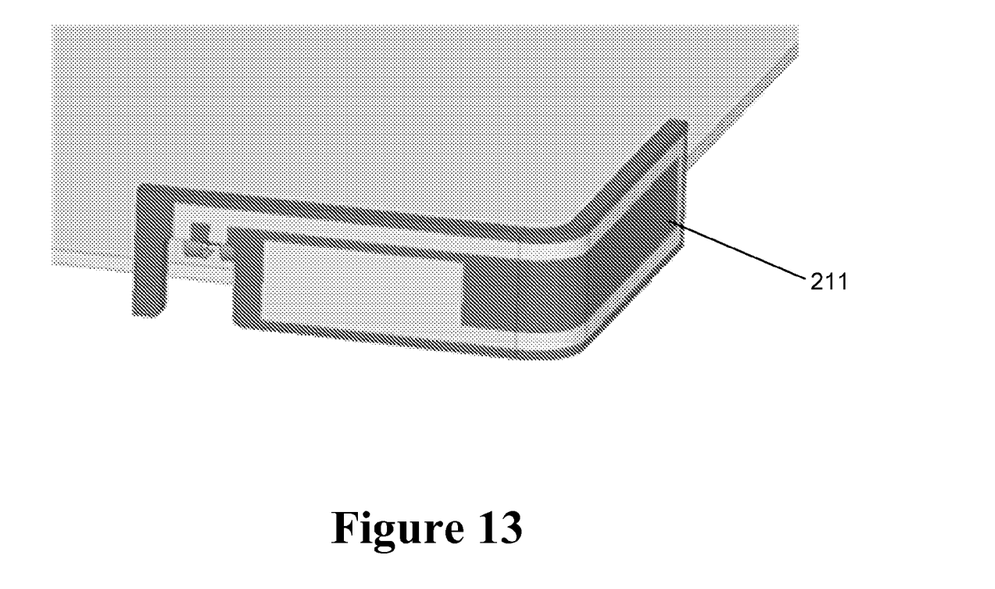
FIG. 13 shows an antenna element.

In alternative embodiments, antenna devices of the present invention may be manufactured by using a Laser Direct Structuring (LDS) process, where the shape of the conductive part of the antenna device is imprinted on a plastic or dielectric support using a laser, followed by plating the support in such a way that only the parts of the support that have been activated by the laser are metallized. The plastic support 211 can be a separate antenna carrier or part of the plastic case of the smartphone and can be used for that purpose without the need of a separate carrier as shown in FIG. 13. As in the case of FPC, the connection to the radio transceiver and the grounding can be done using a pair of elastic spring contacts.

Figure 14:
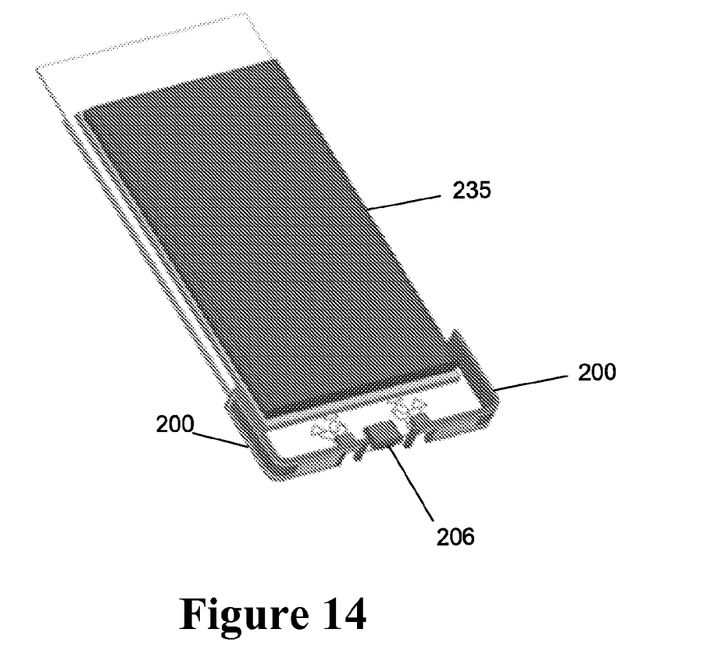
FIG. 14 shows two antenna devices positioned at opposed corners of a smartphone handset.
Figure 15:
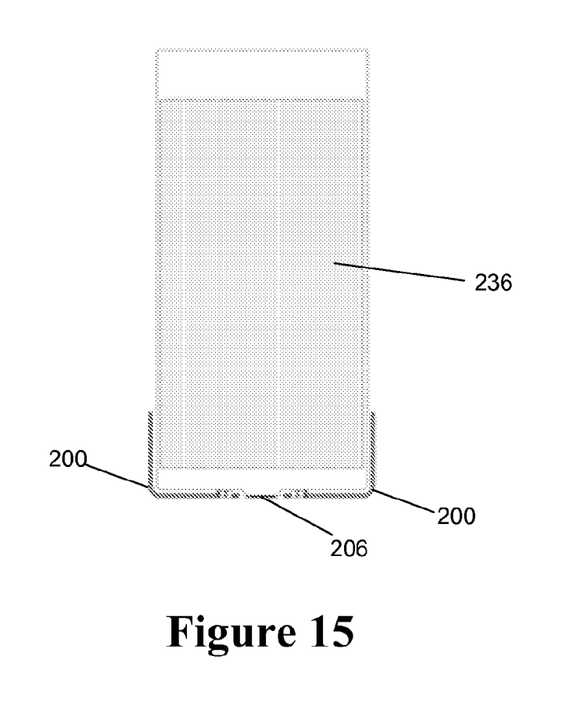
FIG. 15 shows an alternative view of two antenna devices positioned at opposed corners of a smartphone handset.
Figure 16:
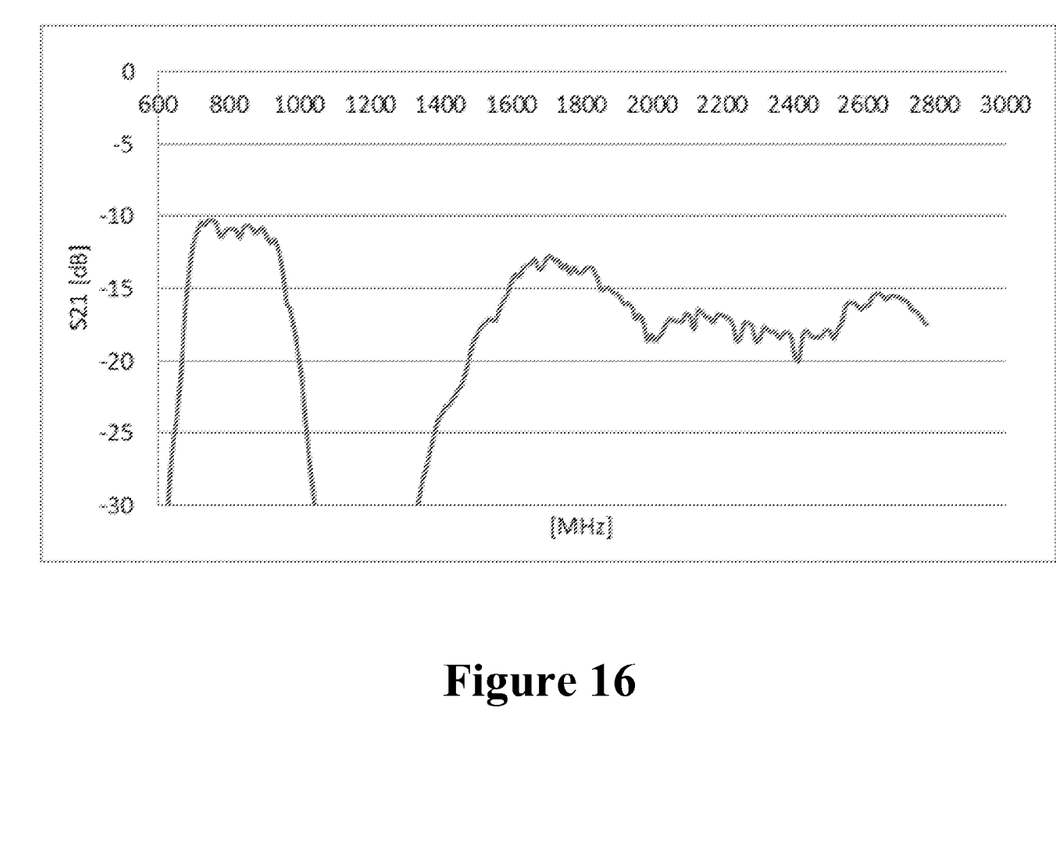
FIG. 16 shows a typical coupling coefficient for the antenna pair disclosed in FIGS. 14 and 15.
Figure 17:
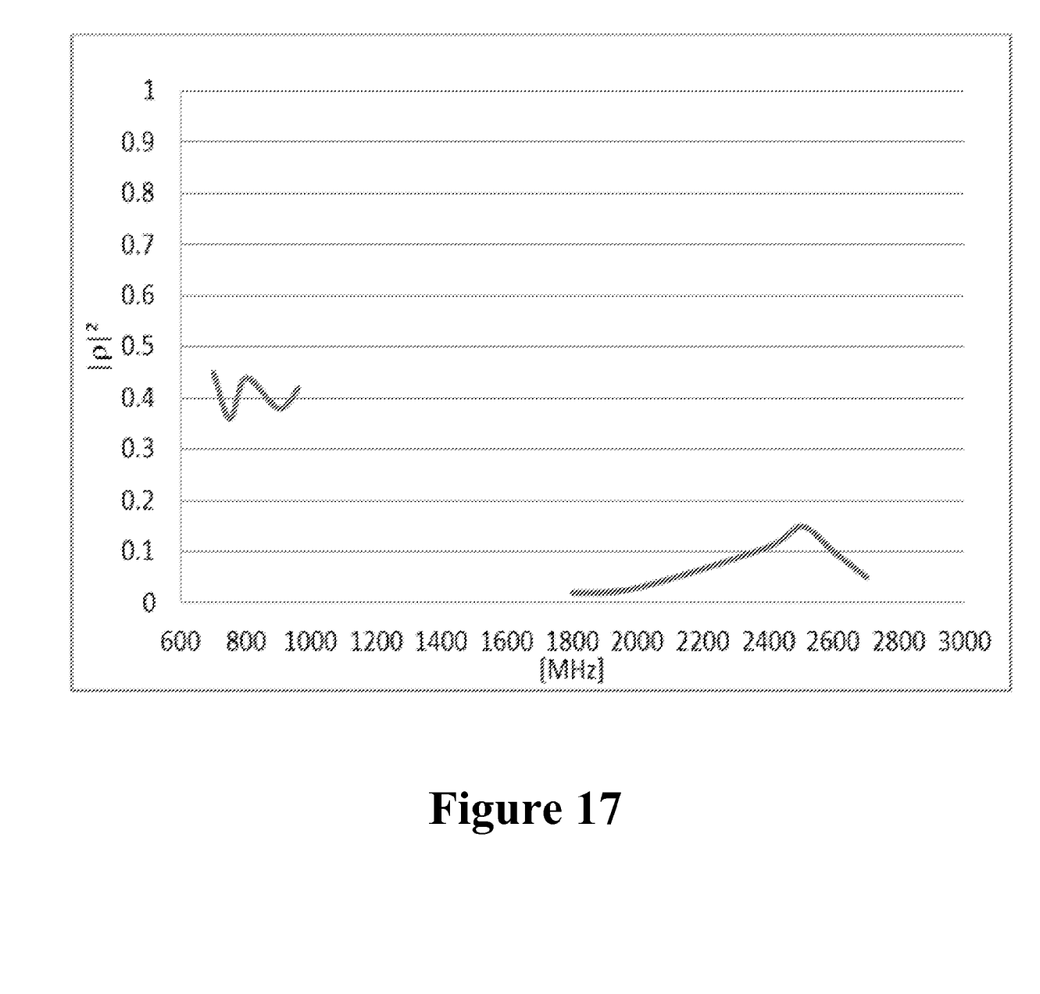
FIG. 17 shows the envelope cross correlation coefficient for the antenna pair disclosed in FIGS. 14 and 15.

One of the advantages of very compact nature of this antenna compared to its lowest frequency of operation and bandwidth is that it can be easily arranged in a multiple input multiple output (MIMO) configuration inside a small terminal. For instance, FIG. 14 shows two similar antennas 200 (one is a mirror image of the other), arranged on the same short edge at the bottom of the terminal or smartphone. FIG. 14 shows a multipurpose connector 206 (e.g. USB and battery charging point) conveniently located in between the two antenna devices 200. When the same arrangement is viewed from the LCD 236 side of the smartphone as in FIG. 15, it is possible to appreciate how this antenna arrangement allows the usage of a large display. Moreover, this arrangement achieves very good MIMO performance because of the low coupling (shown in FIG. 16 to be better than −10 dB), and the low envelope cross correlation coefficient $|\rho|^2$, shown in FIG. 17.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A multiband antenna device comprising a conductive elongate antenna element configured for electrical connection to a conductive groundplane at a grounding point, and for electrical connection to a radio transmitter/receiver at a feeding point, wherein the antenna element comprises a first portion and a second portion, the first portion is configured to extend in a first direction along a first outside edge of the groundplane, and then in a second direction along a second outside edge of the groundplane, and the second portion of the antenna element is configured to double back next to the first portion in a third, substantially counter-parallel direction back along the second outside edge of the groundplane, and then in a fourth direction along the first outside edge of the groundplane, the second portion of the antenna element terminating with a high impedance portion, the high impedance portion of the antenna element being positioned between the first edge of the ground plane and the first portion of the antenna element, and forming a narrow gap that electromagnetically couples the first and second portions of the antenna element.

2. The device of claim 1, wherein the antenna element extends in two planes, each plane substantially orthogonal to the groundplane.

3. The device of claim 2, wherein the two planes are substantially orthogonal to each other.

4. The device of claim 1, wherein the antenna element is configured to fit about or conform to a corner of the groundplane.

5. The device of claim 1, wherein the grounding point and the feeding point are adjacent to each other and provide a shunt inductance near the feeding point which compensates the capacitive behaviour of the antenna and creates an approximate resonance in the antenna impedance.

6. The device of claim 1, wherein an impedance matching circuit is interposed between the feeding point of the antenna element and the radio transmitter/receiver.

7. The device of claim 1, wherein the antenna element is positioned within an area defined by the groundplane, and a portion of the conductive part of the groundplane is removed directly underneath the antenna element.

8. The device of claim 1, wherein the antenna element is provided with an antenna extension comprising an additional portion extending from the antenna element in a third plane substantially parallel to the groundplane so as to increase the effective electrical length of the antenna element.

9. The device of claim 1, wherein the antenna element is connected to the groundplane through an impedance element such as an inductor or a capacitor.

10. The device of claim 9, wherein the impedance element is an electronically controlled variable impedance.

\* \* \* \* \*